(12) United States Patent
Chen et al.

(10) Patent No.: US 11,983,052 B2
(45) Date of Patent: May 14, 2024

(54) DISPLAY DEVICE AND BEZEL THEREOF

(71) Applicant: AU OPTRONICS CORPORATION, Hsin-Chu (TW)

(72) Inventors: Yi-Fan Chen, Hsin-Chu (TW); Che-Chia Chang, Hsin-Chu (TW); Shang-Jie Wu, Hsin-Chu (TW); Yu-Chieh Kuo, Hsin-Chu (TW); Yi-Jung Chen, Hsin-Chu (TW); Yu-Hsun Chiu, Hsin-Chu (TW); Mei-Yi Li, Hsin-Chu (TW); He-Yi Cheng, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 17/333,212

(22) Filed: May 28, 2021

(65) Prior Publication Data
US 2021/0373623 A1 Dec. 2, 2021

(30) Foreign Application Priority Data
Jun. 1, 2020 (TW) ................................ 109118348

(51) Int. Cl.
*G06F 1/18* (2006.01)
*G09F 9/33* (2006.01)

(52) U.S. Cl.
CPC .............. *G06F 1/189* (2013.01); *G06F 1/181* (2013.01); *G09F 9/33* (2013.01); *G06F 2200/1612* (2013.01)

(58) Field of Classification Search
CPC .................................................... H05K 1/117
See application file for complete search history.

(56) References Cited

U.S. PATENT DOCUMENTS 10,129,988 B2 * 11/2018 Chen .................. H05K 1/111
2009/0033609 A1 * 2/2009 Ashizawa ........... G02F 1/13458
345/92

(Continued)

FOREIGN PATENT DOCUMENTS

CN 106014135 A 10/2016
CN 209056208 U 7/2019
(Continued)

OTHER PUBLICATIONS

Taiwan Intellectual Property Office, Office Action, dated Dec. 21, 2020.
(Continued)

*Primary Examiner* — Jerry Wu
(74) *Attorney, Agent, or Firm* — WPAT, P.C

(57) ABSTRACT

A display device and a bezel thereof are provided. The display device includes a display panel and a bezel. The display panel has a first surface and a second surface. The first surface includes at least one pixel pad section, and the second surface includes at least one circuit pad section. The bezel includes a first surface connecting portion, a second surface connecting portion and at least one conductive wire. The edge of the display panel having the pixel pad section and the circuit pad section is accommodated between the first surface connecting portion and the second surface connecting portion. Each conductive wire has a first end and a second end. The first end is disposed on the first surface connecting portion and the second end is disposed on the second surface connecting portion. The part of the first connecting portion having the first end corresponds to the pixel pad section, and the part of the second connecting portion having the second end corresponds to the circuit pad section.

18 Claims, 10 Drawing Sheets

(56) References Cited

U.S. PATENT DOCUMENTS

| | | | |
|---|---|---|---|
| 2009/0201438 A1 | 8/2009 | Kim et al. | |
| 2017/0148374 A1* | 5/2017 | Lee | G02F 1/13336 |
| 2020/0295107 A1 | 9/2020 | Liu et al. | |

FOREIGN PATENT DOCUMENTS

| | | |
|---|---|---|
| CN | 110379312 A | 10/2019 |
| CN | 110738936 A | 1/2020 |
| TW | I610281 B | 1/2018 |
| TW | I680444 | 12/2019 |

OTHER PUBLICATIONS

CNIPA Patent Office has issued the 2nd Office Action for the corresponding China application dated May 27, 2022.
CNIPA has issued the Office Action for the corresponding China application dated Mar. 1, 2022.
India has issued the Office Action for the corresponding India application dated Feb. 24, 2022.

* cited by examiner

DISPLAY DEVICE AND BEZEL THEREOF

BACKGROUND OF THE INVENTION

1. Field of the Invention

The present disclosure relates to a display device and a bezel thereof; it especially relates to a display device having a conductive wire to transmit a control signal.

2. Description of the Prior Art

In the process of developing display technologies, in order to satisfy the ever-increasing demands of picture qualities and to enhance workmanship of the display device such as reducing distances between pixels, side wirings will be added to the manufacturing process of the display device. As a result, a driver circuit of a light-emitting element may be disposed on the backend of a panel, and the driver circuit may be electrically connected to the light-emitting element located at the frontend of the panel through the side wiring so as to drive the light-emitting element to emit light in accordance with the control signal. In addition, the side wiring is also useful for splicing frameless panels.

However, the complexity of the side wiring manufacturing process often causes reduction in the panel production yield rate. In addition, splicing the frameless panels easily causes damages to the edges of the panel. Therefore, in the existing art, there is room for improvement when it comes to technologies for splicing frameless panels or narrow-framed panels.

As mentioned above, in order to solve the shortcomings of the current technologies, the present disclosure provides a display device and a bezel thereof. Signal transmission between the front and back of the panel is achieved by disposing a conductive wire on the frame so as to increase the yield rate of the panel and to avoid damages which might occur in the splicing of the frameless panel.

One of the technical protocols in the embodiments of the present disclosure provides a bezel of a display device. The bezel is used for a display panel. The display panel has a first surface and a second surface. The first surface has a pixel pad section, and the second surface has a circuit pad section. The bezel includes a first surface connecting portion, a second surface connecting portion, and a conductive wire. The edge of the display panel having the pixel pad section and the circuit pad section is accommodated between the first surface connecting portion and second surface connecting portion. The conductive wire has a first end and a second end. The first end is disposed on the first surface connecting portion, and the second end is disposed on the second surface connecting portion. A portion of the first surface connecting portion having the first end corresponds to the pixel pad section, and a portion of the second surface connecting portion having the second end corresponds to the pixel pad section.

SUMMARY OF THE INVENTION

Another technical solution of the present disclosure provides a display device, including a display panel and a bezel. The display panel has a first surface and a second surface. The first surface has at least one pixel pad section. The second surface has at least one circuit pad section. The bezel includes a first surface connecting portion, a second surface connecting portion, and at least one conductive wire. The edge of the display panel having at least one pixel pad section and at least one circuit pad section is accommodated between the first surface connecting portion and the second connecting portion. The number of at least one conductive wire corresponds to the number of at least one pixel pad section and the number of at least one circuit pad section. Each of the conductive wires has a first end and a second end. The first end is disposed on the first surface connecting portion and electrically connected to the corresponding pixel pad section. The second end is disposed on the second surface connecting portion and electrically connected to the corresponding circuit pad section.

In order to further understand the features and technical contents of the present disclosure, please refer to detailed description and drawings of the present disclosure; however, the provided drawings are only used for reference and description; and never used to limit the scope of the present disclosure.

DETAILED DESCRIPTION OF THE PREFERRED EMBODIMENT

The display device and the bezel thereof according to the present disclosure will be described in detail below through embodiments and with reference to FIG. 1 to FIG. 14. People skilled in the art may understand the advantages and effects of the present disclosure through the contents disclosed in the present specification. However, the contents shown in the following sentences never limit the scope of the present disclosure. Without departing from the conception principles of the present invention, people skilled in the art may realize the present disclosure through other embodiments based on different views and applications.

In the attached FIGS., for the purpose of clarification, the thicknesses of layers, films, panels, regions and the like are amplified. In the whole specification, the same marks represent the same element. It should be understood that, when an element such as a layer, a film, a panel, a region or a substrate are described as "being on" or "being connected to" another element, they may be directly on or connected to another element, or there may be other elements therebetween. On the other hand, when an element is described as "directly existing on" another element or "being directly connected to" another element, there is no element therebetween. As used in the present specification, a "connection" may be a physical and/or electrical connection.

It should be understood that, even though the terms such as "first", "second", "third" may be used to describe an element, a part, a region, a layer and/or a portion in the present specification, but these elements, parts, regions, layers and/or portions are not limited by such terms. Such terms are merely used to differentiate an element, a part, a region, a layer and/or a portion from another element, part, region, layer and/or portion. Therefore, in the following discussions, a first element, portion, region, layer or portion may be called a second element, portion, region, layer or portion, and do not depart from the teaching of the present disclosure.

First Embodiment

Figure 1:
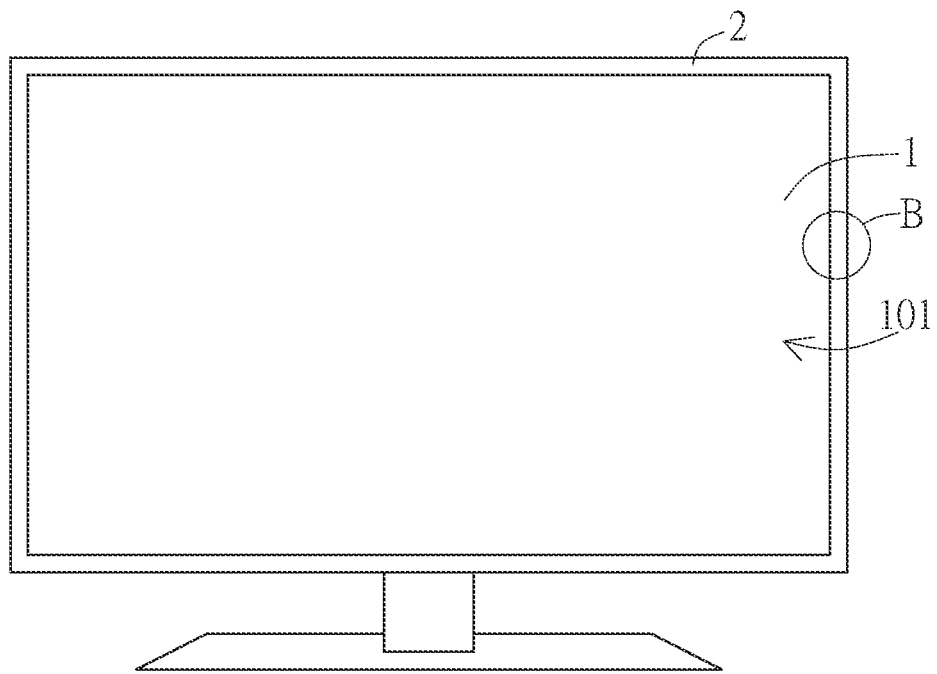
FIG. 1 is a diagram of the display device in a first embodiment of the present disclosure.
Figure 2:
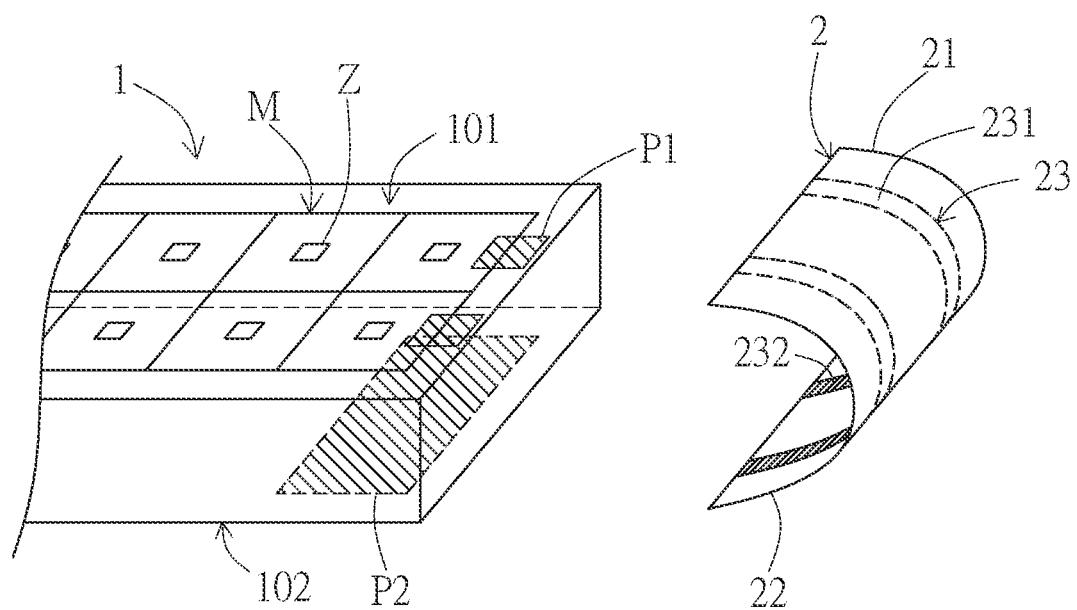
FIG. 2 is a partial exploded view of the display device in the first embodiment of the present disclosure.

Please refer to FIG. 1. A display device U in the first embodiment of the present disclosure has a display panel 1 and a bezel 2. Please refer to FIG. 1 and FIG. 2. FIG. 2 is an enlarged diagram of a portion B in FIG. 1 after adjusting angles. The display panel 1 has a first surface 101 and a second surface 102. In the present embodiment, the first surface 101 and the second surface 102 are two opposite surfaces of display panel 1, wherein the first surface 101 functions as a display surface of the display device U. As shown in FIG. 1, in the present embodiment, the display device U is a self-luminous display device. An image is displayed by a pixel array M consisting of a plurality of light-emitting elements Z located at the first surface 101, and the light-emitting elements Z are micro LEDs. However, the present disclosure is not limited thereto. In different embodiments, the bezel 2 may also be disposed with a self-luminous display device whose light source is not Micro LED, or a display device other than a self-luminous display device, so as to transmit signals between different surfaces of a substrate of the display device.

Figure 3:
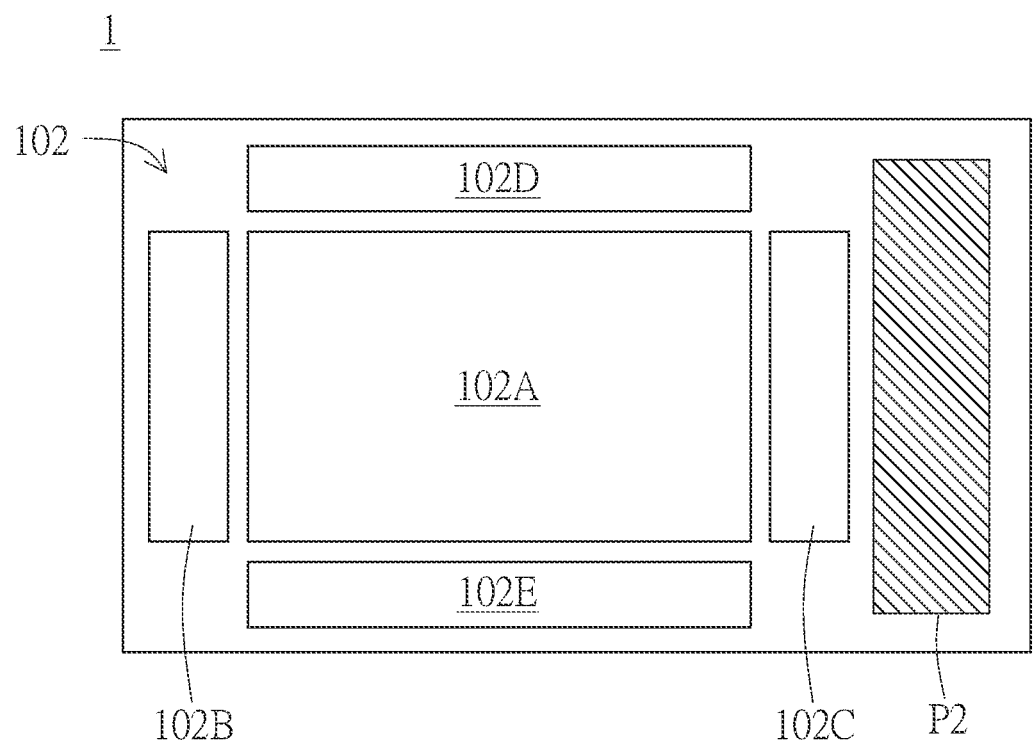
FIG. 3 is a diagram of a second surface of a display panel in the first embodiment of the present disclosure.

Furthermore, please refer to FIG. 2. The first surface 101 has a pixel pad section P1, and the second surface 102 has a circuit pad section P2. In the actual applications, the pixel pad section P1, for example, may include a plurality of gate wire pads or a plurality of source wire pads. Each of the gate wire pads is electrically connected to the corresponding gate of the light-emitting elements Z, and each of the source wire pads is electrically connected to the corresponding source of the light-emitting elements Z. In the present embodiment, the circuit pad section P2 is electrically connected a light-emitting control circuit disposed on the second surface 102. For example, please refer to FIG. 3. A driver circuit 102A of the pixel array M, gate driver circuits (102B, 102C) and source driver circuits (102D, 102E) are disposed on the second surface 102 of the present embodiment, wherein, each of the pixel array driver circuit 102A, the gate driver circuits (102B, 102C) and the source driver circuits (102D, 102E) is electrically connected to the circuit pad section P2. The circuit pad section P2 may include a plurality of circuit pads respectively and electrically connected to the pixel array driver circuit 102A, the gate driver circuits (102B, 102C) and the source driver circuits (102D, 102E). And each of the circuit pad is insulated against each other in the circuit pad section P2. The configuration of the control circuit illustrated in FIG. 3 is merely described as an example, and the present disclosure is not limited thereto.

Please continue to refer to FIG. 2. The edge of the display panel 1 having the pixel pad section P1 and the circuit pad section P2 is accommodated between a first surface connecting portion 21 and a second surface connecting portion 22 of the bezel 2. Furthermore, the bezel 2 has a conductive wire 23 on it. A first end 231 of the conductive wire 23 is disposed on the first surface connecting portion 21, and a portion of the first surface connecting portion 21 on which the first end 231 is disposed corresponds to the pixel pad section P1; the second end 232 of the conductive wire 23 is disposed on the second surface connecting portion 22, and a portion of the second surface connecting portion 22 on which the second end 232 is disposed corresponds to the circuit pad section P2. Specifically, in the present embodiment, the number of the conductive wires 23 corresponds to the number of the pixel pad sections P1, and the location of the first end 231 of each of the conductive wires 23 respectively corresponds to the corresponding pixel pad section P1. The two conductive wires 23 are disposed on the bezel 2 illustrated in FIG. 2 merely as a representative example; however, the present disclosure is not limited thereto. Through the aforementioned structural features in the present embodiment, the control signals produced by the driver circuits (102A, 102B, 102C, 102D and 102E) disposed on the second surface 102 may be transmitted to the first surface 101 through the conductive wire 23 so as to control each of the light-emitting elements Z of the pixel array M to make them emit light in accordance with the control signal.

Figure 4:
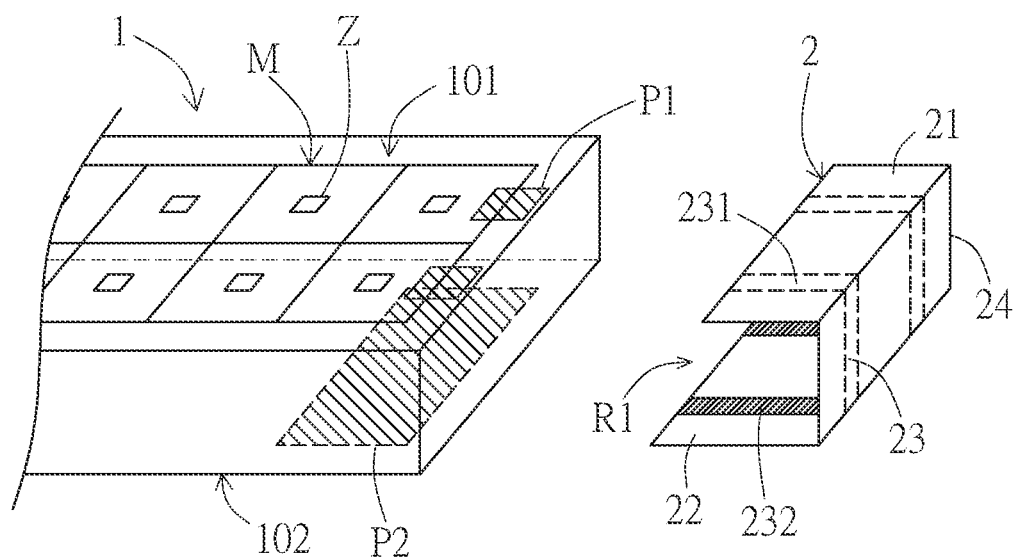
FIG. 4 is a variation of the embodiment of FIG. 2.

FIG. 4 illustrates a variation of the embodiment of the present disclosure, wherein the main difference compared to the bezel 2 in FIG. 2 is that the first surface connecting portion 21 and the second surface connecting portion 22 of the bezel 2 in FIG. 4 are shaped like flat plates, and further include a side plate 24 so as to connect the first surface connecting portion 21 and the second surface connecting portion 22. Specifically, the side plate 24 is connected between the first surface connecting portion 21 and the second surface connecting portion 22, forming an accommodation space R1 with the first surface connecting portion 21 and the second surface connecting portion 22 so as to accommodate the display panel 1. The arc-shaped bezel 2 in FIG. 2 and the rectangular bezel in FIG. 4 are used as an example to describe features of the present disclosure; however, the present disclosure is not limited thereto. As long as the bezel 2 has a first surface connecting portion 21, a second surface connecting portion 22 and a conductive wire 23 having two ends respectively disposed on the first surface connecting portion 21 and the second surface connecting portion 22, bezel 2's function of signal transmission can be achieved.

Figure 5A:
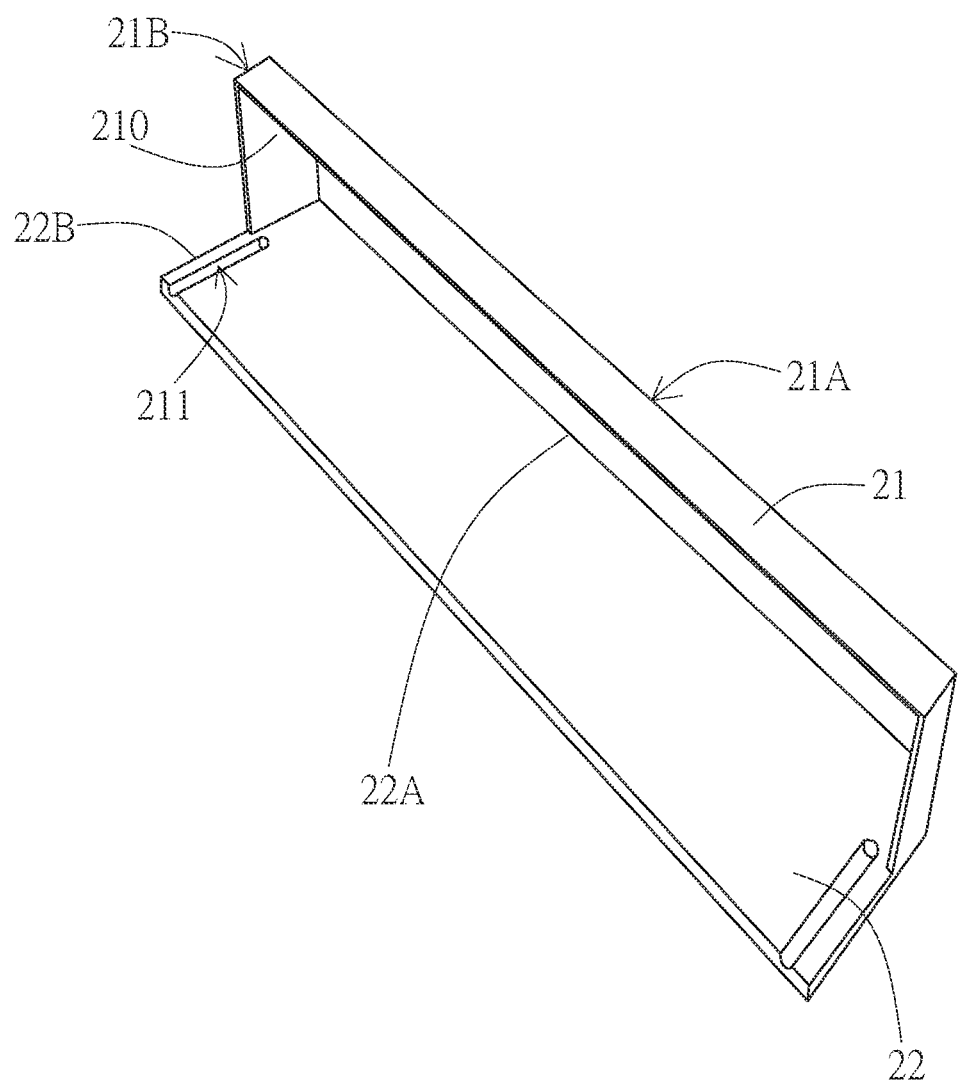
FIG. 5A is a diagram of a bezel in the first embodiment of the present disclosure.
Figure 5B:
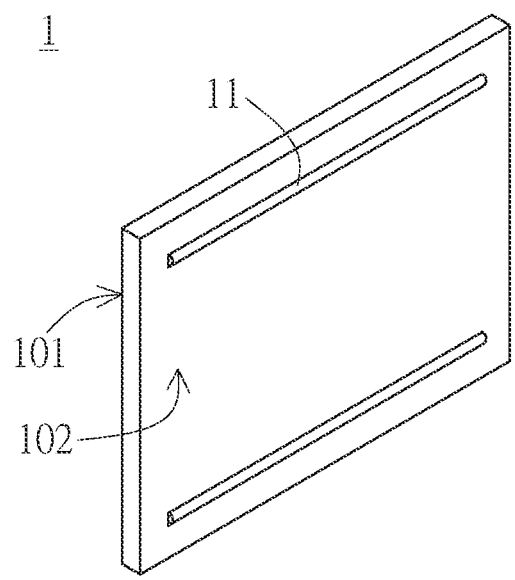
FIG. 5B is a diagram of the display panel in the first embodiment of the present disclosure.
Figure 5C:
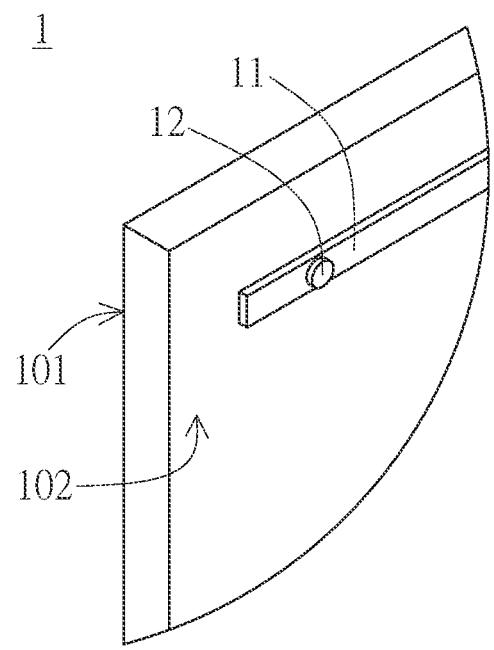
FIG. 5C is a partially enlarged diagram of the display panel in the first embodiment of the present disclosure.

Please refer to FIG. 5A. In the present embodiment, the bezel 2 further has a positioning unit 211. The positioning unit 211, for example, may have a groove structure; however, the present disclosure is not limited thereto. As shown in FIG. 5B, the display panel 1 may have a counterpart positioning unit 11, which may complement the positioning unit 211. In the present embodiment, the counterpart positioning unit 11 is a convex structure which may complement the groove structure in FIG. 5A, such as a structure formed by directly processing the substrate of the display panel 1 or by pasting a structure to it; however, the present disclosure is not limited thereto. The counterpart positioning unit 11 is disposed on the second surface 102 of the display panel 1. Through the aforementioned structures, the display panel 1 may be installed in the bezel 2, for example, by sliding the convex structure into the groove structure. The groove structure and the convex structure complement each other. After the display panel 1 is installed in the bezel 2, the stable positioning effect can be achieved or it is at least possible to limit shifting of the bezel 2 with respect to the display panel 1 within a certain range so as to avoid the display panel 1 shifting in the bezel 2, affecting signal transmitting. It should be noted that the positioning unit 211 and the counterpart positioning unit 11 are not limited to the aforementioned patterns. For example, the counterpart positioning unit 11 may further include a round structure 12 as illustrated in FIG. 5C so that the counterpart positioning unit 11 may be easily stuck in the positioning unit 211 which appears to be a groove structure in the bezel 2.

In the embodiment of FIG. 5A, the bezel 2 further include a guard plate 210. Specifically, the first surface connecting portion 21 has a first long side 21A and a first broadside 21B, and the second surface connecting portion 22 has a second long side 22A and a second broadside 22B. In the embodiment of FIG. 5A, the first long side 21A and the second long side 22A are connected to each other through the side plate 24; however, the present disclosure is not limited thereto. In a different embodiment, they may be directly connected to each other or they may be connected using other ways. The guard plate 210 is connected between the first broadside 21B of the first surface connecting portion 21 and the second broad side 22B of the second surface connecting portion 22. When an edge of the display panel 1 is assembled to the bezel 2, the guard plates 210 can be respectively disposed on the two sides of the edge of the display panel 1. Through disposing the guard plate 210, the bezel 2's first surface connecting portion 21 and the second surface connecting portion 22 in the present embodiment can provide a more comprehensive protection of the four corners of the display panel 1.

As mentioned above, the display device U provided in the present embodiment provides the conductive wire 23 on the bezel 2, the pixel pad section P1 on the first surface 101 and the circuit pad section P2 on the second surface 102, so that control signals produced by the light-emitting element located on the second surface 102 of the display panel 1 can be transmitted to the first surface 101 through the bezel 2 so as to control the light-emitting of the light-emitting element. Thus, the present embodiment can help solve the problem of poor yield rate of the side wiring in the process of manufacturing frameless panels or narrow-framed panels.

Second Embodiment

Figure 6:
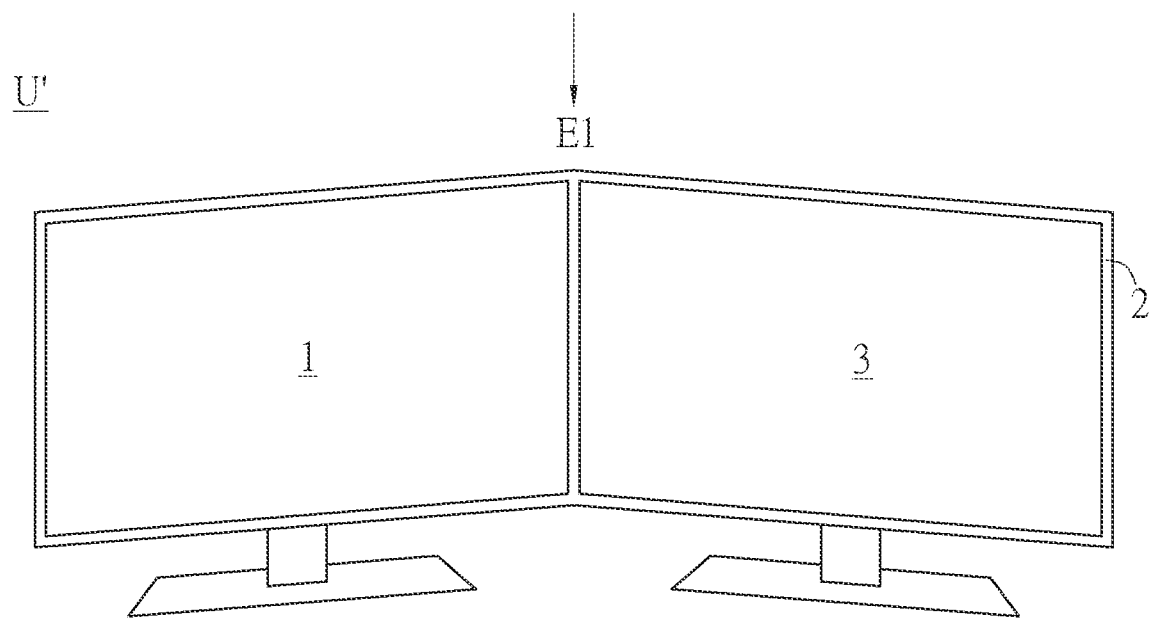
FIG. 6 is a diagram of the display device in the second embodiment of the present disclosure.
Figure 7:
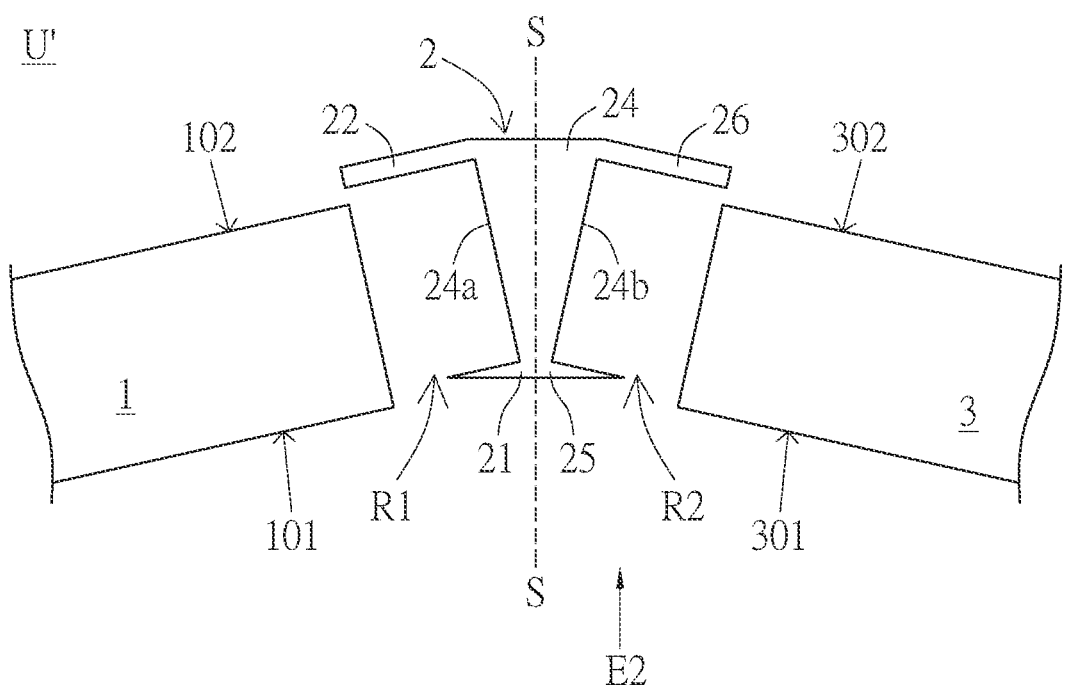
FIG. 7 is a top view exploded diagram of the display device in the second embodiment of the present disclosure.

Please refer to FIG. 6. The display device U' provided in the second embodiment of the present disclosure includes the display panel 1, a second display panel 3 and the bezel 2. FIG. 7 is a diagram of the view of display device U' in FIG. 6 along the direction E1. Please refer to FIG. 6 and FIG. 7 together. The difference between the display device U' in the present embodiment and the first embodiment is that the present embodiment further includes the second display panel 3 having a third surface 301 and a fourth surface 302, and the bezel 2 further includes a third surface connecting portion 25 and a fourth surface connecting portion 26 so as to accommodate the second display panel 3.

Figure 8:
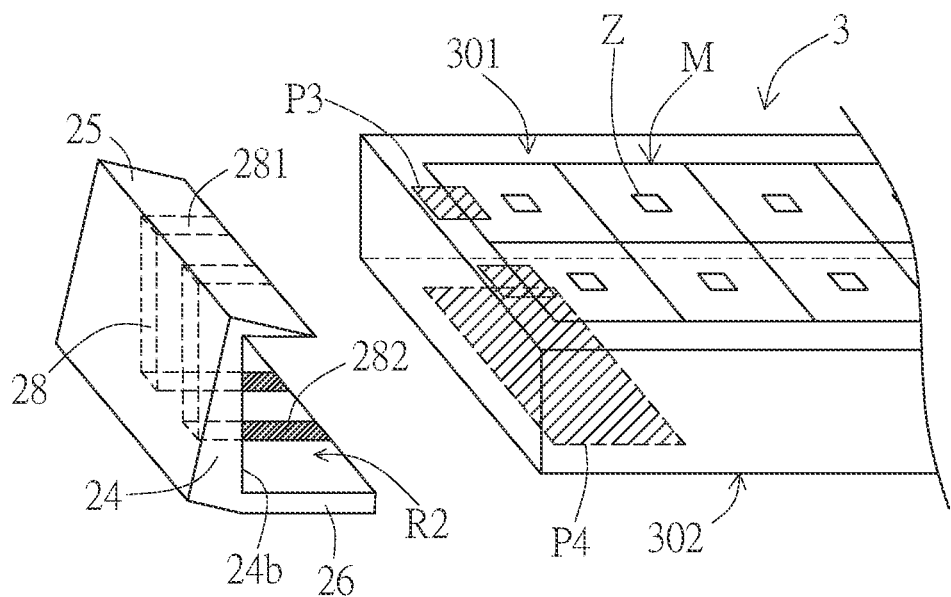
FIG. 8 is a partially exploded diagram of a portion of the bezel and a second panel of the display device in the second embodiment of the present disclosure.

In FIG. 7, the left side of the section line SS is the portion of the display panel 1 and bezel 2 having the first surface connecting portion 21 and the second surface connecting portion 22, whose structures are same as the first embodiment; therefore, they will not be described in detail again here. The right side of the section line SS is the portion of the second display panel 3 and the bezel 2 having the third surface connecting portion 25 and the fourth surface connecting portion 26, which have structures corresponding to the display panel 1 in the first embodiment. Specifically, please refer to FIG. 7 and FIG. 8 together, wherein FIG. 8 illustrates an enlarged diagram of the bezel 2 on the right side of the section line SS and the second display panel. The third surface 301 of the second display panel 3 has a second pixel pad section P3 which includes at least one pixel pad; and the fourth surface 302 has a second circuit pad section P4 which includes at least one circuit pad. The side of the second display panel 3 having the second pixel pad section P3 and the second circuit pad section P4 is accommodated between the third surface connecting portion 25 and the fourth surface connecting portion 26 of the bezel 2.

Please refer to FIG. 8 again. The bezel of the present embodiment has at least one second conductive wire 28 disposed on the side of the third surface connecting portion 25 and the fourth surface connecting portion 26 configured to accommodate the second display panel 3. Specifically, as shown in FIG. 8, each of the second conductive wires 28 has a third end 281 and a fourth end 282, wherein the third end 281 is disposed on the third surface connecting portion 25, and the fourth end 282 is disposed on the fourth surface connecting portion 26. The third end 281 is electrically connected to the second pixel pad section P3 of third surface 301, and the fourth end 282 is electrically connected to the second circuit pad section P4 of the fourth surface 302. In addition, in the present embodiment, the number of the second conductive wires 28 corresponds to the number of the second pixel pad section P3. The two second conductive wires 28 are disposed in the bezel 2 illustrated in FIG. 8 merely as a representative example; however, the present disclosure is not limited thereto. In a different embodiment, the number of the second pixel pad section P3 may be only one, which has a plurality of pixel pads, and insulating treatments are conducted between the pixel pads; however, the present disclosure is not limited thereto. A portion of the third surface connecting portion 25 having the third end 281 is disposed corresponding to each of the pixel pads; and a portion of the fourth surface connecting portion 26 having the fourth end 282 corresponds to the second circuit pad section.

Through the aforementioned structural features, the bezel 2 in the present embodiment may splice the display panel 1 and the second display panel 3 by disposing the third surface connecting portion 25, the fourth surface connecting portion 26, and the second conductive wire 28 so as to decrease damages which might occur when splicing the panels. In addition, the bezel 2 may electrically connect the third surface 301 and the fourth surface 302 by disposing the second conductive wire 28; thus, the control circuit of the light-emitting elements Z may be disposed on the fourth surface 302, so that the signal of the circuit is transmitted to the third surface 301 through the second conductive wire 28 so as to control each of the light-emitting elements Z of the pixel array M of the second display panel 3 to make them emit light in accordance with the control signal; thus, frameless display panels can be achieved. At the same time, the aforementioned structure can omit the side wiring manufacturing process implemented on the side surface of the panel in the conventional technologies so as to solve the problem of poor panel yield rate.

Figure 9:
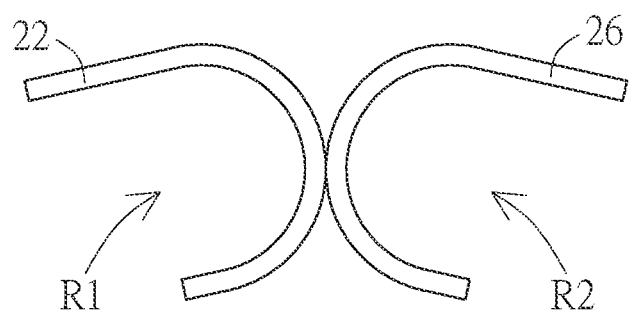
FIG. 9 is a diagram of the bezel in the second embodiment of the present disclosure.

In the embodiment of FIG. 7 and FIG. 8, the structure of the bezel 2 corresponds to the embodiment in FIG. 4; that is, the first surface connecting portion 21, the second surface connecting portion 22, the third surface connecting portion 25 and the fourth surface connecting portion 26 are shaped like plates. And the bezel 2 has a side plate 24; the side plate 24 has a first side surface 24a connecting the first surface connecting portion 21 and the second surface connecting portion 22; the side plate 24 also has a second side surface 24b connecting the third surface connecting portion 25 and the fourth surface connecting portion 26. The first side surface 24a, the first surface connecting portion 21 and the second surface connecting portion 22 together form an accommodation space R1 so as to accommodate the display panel 1; the second side surface 24b, the third surface connecting portion 25 and the fourth surface connecting portion 26 together form a second accommodation space R2 so as to accommodate the second display panel 3. However, the present disclosure is not limited thereto. The bezel 2 of the display device U' in the present embodiment may also be shaped like an arc as the bezel 2 in FIG. 2; thus, the accommodation spaces R1, R2 can be formed without disposing the side plate, as shown in FIG. 9.

Figure 10:
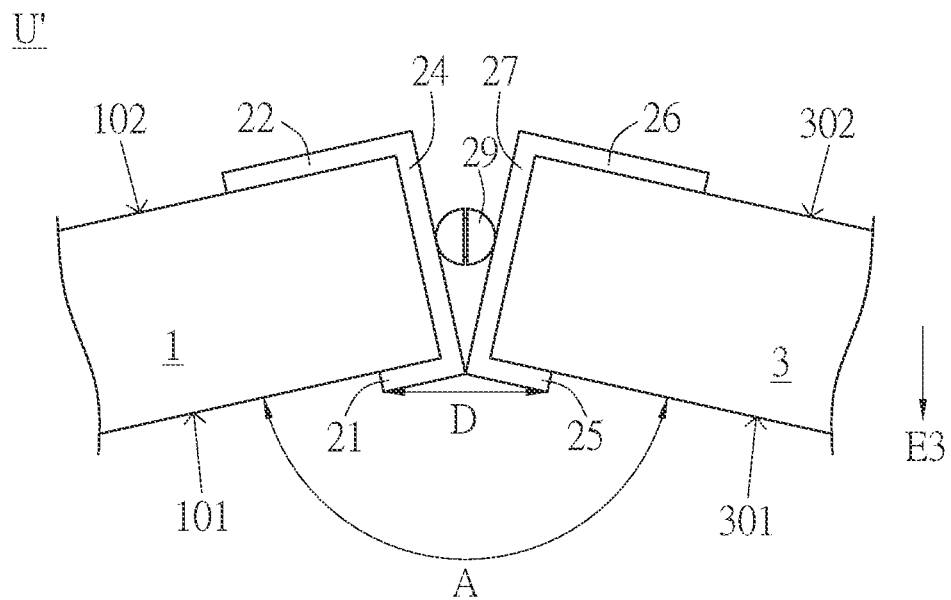
FIG. 10 is a top view exploded diagram of the display device in a variation of the second embodiment of the present disclosure.
Figure 11:
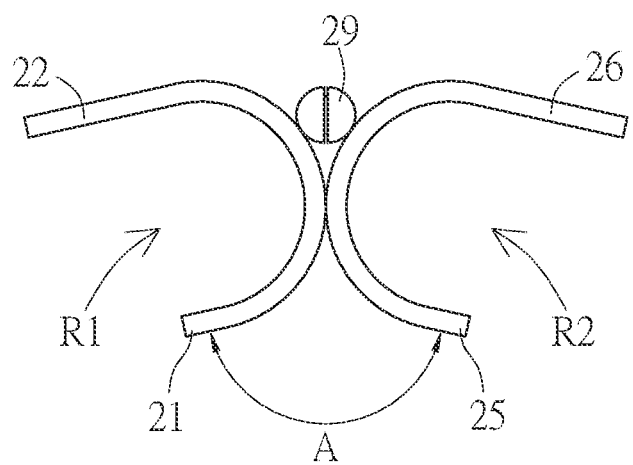
FIG. 11 is a diagram of a bezel in the second embodiment of the present disclosure.

Please refer to FIG. 10 and FIG. 11. In a variation embodiment, the display device U' of the present embodiment may have a pivotal element 29. The pivotal element 29 is connected among the first surface connecting portion 21, the second surface connecting portion 22, the third surface connecting portion 25 and the fourth surface connecting portion 26 so as to adjust an included angle A between the display panel 1 and the second display panel 3 opposite to the pivotal element 29. In the present embodiment, the bezel 2 further has a second side plate 27 connecting the third surface connecting portion 25 and the fourth surface connecting portion 26. And the pivotal element 29 is disposed between the side plate 24 and the second side plate 27, so that the pivotal element 29 is connected among the first surface connecting portion 21, the second surface connecting portion 22, the third surface connecting portion 25 and the fourth surface connecting portion 26 so as to control their spins with respect to the pivotal element 29. However, the present disclosure is not limited thereto. Please refer to a variation embodiment in FIG. 11. The pivotal element 29 may be integrated into the embodiment of the arc-shaped bezel 2; that is, it may be directly connected among the first surface connecting portion 21, the second surface connecting portion 22, the third surface connecting portion 25 and the fourth surface connecting portion 26 so as to adjust an included angle between the accommodation space R1 and the second accommodation space R2 opposite to the pivotal element 29.

Figure 12:
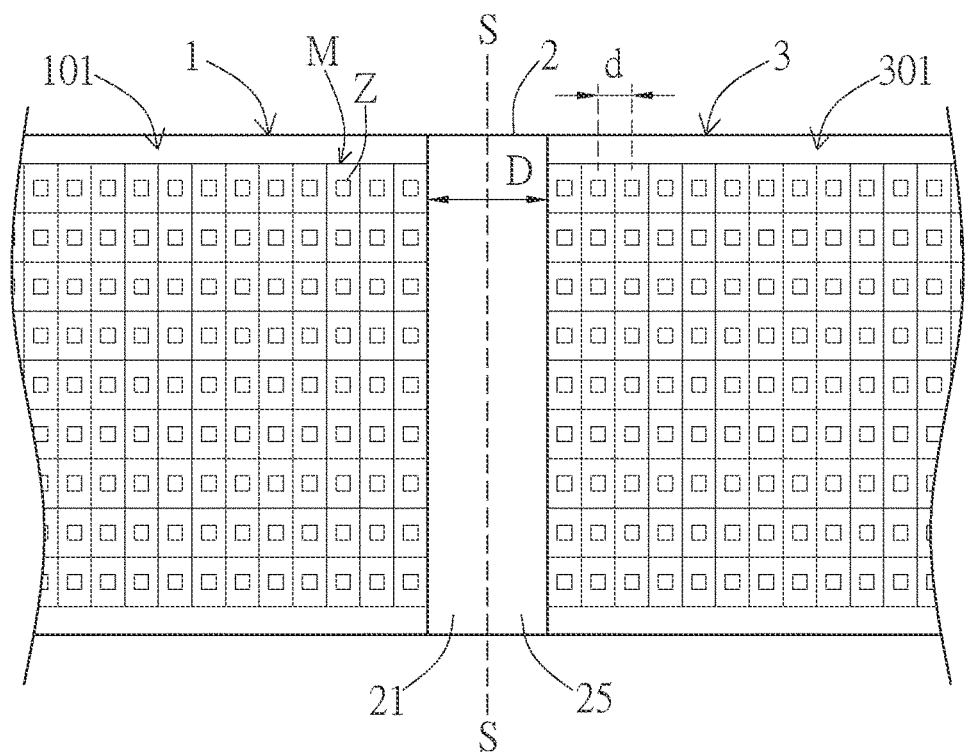
FIG. 12 is a partial diagram of the display panel in the second embodiment of the present disclosure.

FIG. 12 illustrates a partially enlarged diagram of the view of the display device U' in FIG. 7 along the direction E2. In order to make display screens of the display panel 1 and the second display panel 3 to have no gap or little gap visually in the present embodiment, the minimum total width D of the first surface connecting portion 21 and the third surface connecting portion 25 is preferably smaller than or equals to 6 times the pixel distance d. Specifically, referring to FIG. 12, the pixel distance d means the distance d between one of the light-emitting element Z and its adjacent light-emitting element Z. Please refer to FIG. 10 and FIG. 12 together. In the present embodiment, the minimum total width D means a projected total length of the first surface connecting portion 21 and the third surface connecting portion 25 along the display direction E3.

In the aforementioned embodiment, the pixel pad section P1 and the second pixel pad section P3 are disposed on the side of the light-emitting elements Z located at an edge of the pixel array M away from the center of the pixel array as illustrated in FIG. 4 and FIG. 8. However, the present disclosure is not limited thereto. For example, please refer to FIG. 13 and FIG. 14 together. In a variation embodiment, the pixel pad section P1 may be disposed between the light-emitting elements Z located at the edge of the pixel array M. Specifically, referring to FIG. 14, the embodiment in which the pixel pad section P1 and the second pixel pad section P3 are disposed between the light-emitting elements Z can work with the first surface connecting portion 21 and the third surface connecting portion 25 which include portions made of transparent materials. As such, after the display panel 1 and the second display panel 3 are installed in the bezel 2, the first end 231 of the conductive wire 23 is electrically connected to the pixel pad section P1, the second end 232 is electrically connected to the circuit pad section P2, the third end 281 of the second conductive wire 28 is electrically connected to the second pixel pad section P3, the fourth end 282 is electrically connected to the second circuit pad section P4, and a part of the light-emitting elements Z will be covered by the first surface connecting portion 21 or the third surface connecting portion 25. However, since the materials covering the first surface connecting portion 21 or the third surface connecting portion 25 are light transparent or at least partially light transparent, light emitted by the light-emitting elements Z covered by the first surface connecting portion 21 or the third surface connecting portion 25 at the edge of the pixel array M can pass through or partially pass through the first surface connecting portion 21 and the third surface connecting portion 25.

Figure 13:
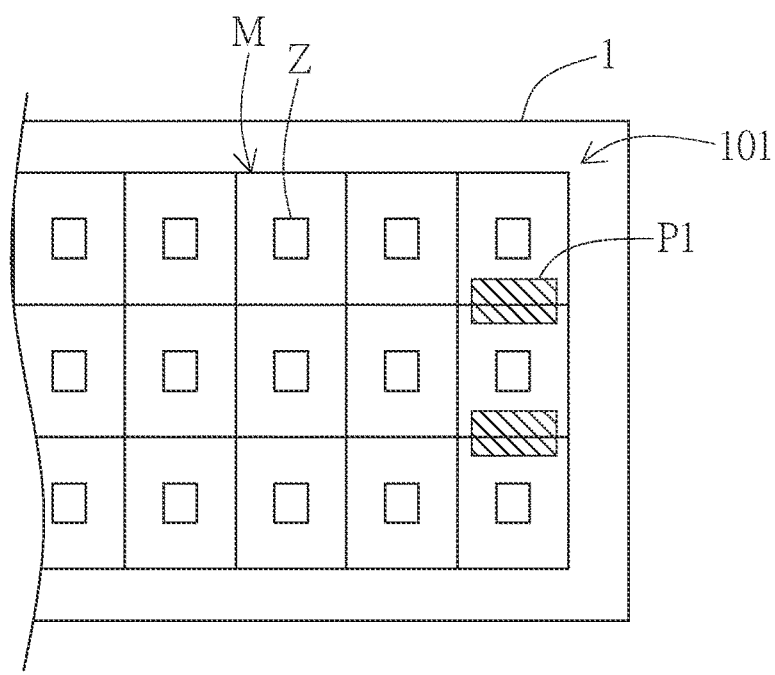
FIG. 13 is a partial diagram of the display panel in the second embodiment of the present disclosure.
Figure 14:
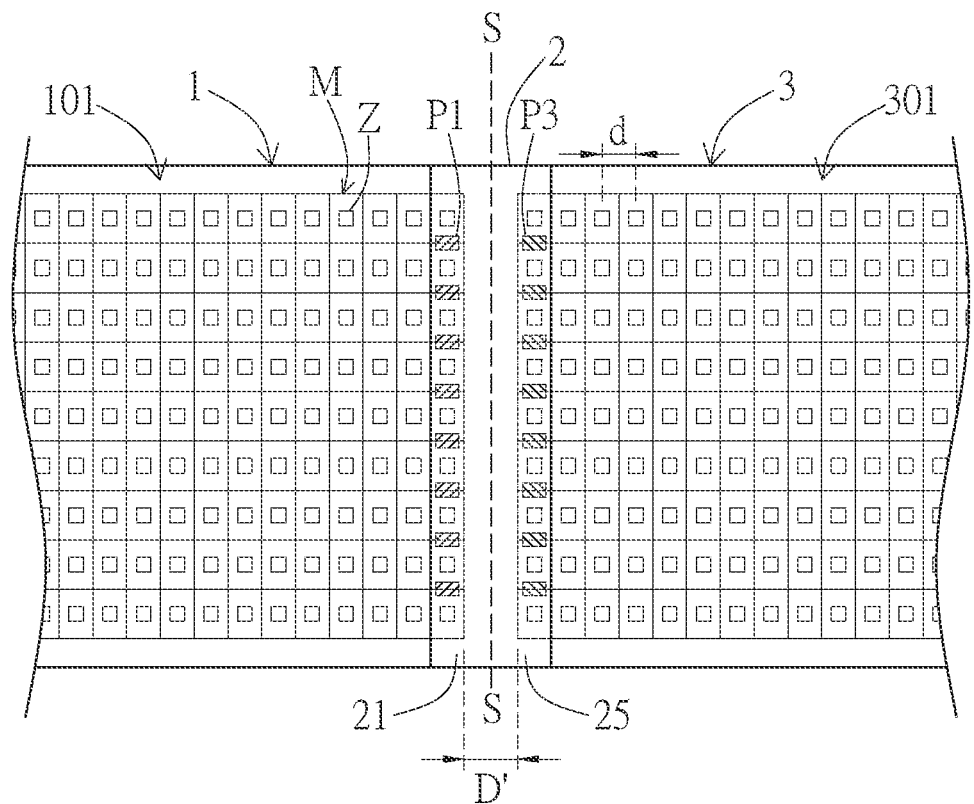
FIG. 14 is a partial diagram of the display panel in the second embodiment of the present disclosure.

In addition, in a variation embodiment in FIG. 13 and FIG. 14 where the minimum distance D' between the edge of the pixel array M of the display panel 1 and the edge of the pixel array M of the second display panel 3 equals to or is smaller than 6 times the pixel distance, a spliced panel display device without visual gaps can be achieved. The present embodiment can work with conductive wire 23 and second conductive wire 28 made of transparent conductive materials so as to increase picture quality of the spliced portion between the display panel 1 and the second display panel 3.

The aforementioned description merely represents the preferred embodiment of the present disclosure, without any intention to limit the scope of the present disclosure. Various equivalent alternation based on the specification and FIGS. are consequently viewed as being embraced by the scope of the present disclosure.

What is claimed is:

1. A bezel of a display device used for a display panel, wherein the display panel has a first surface and a second surface opposite to each other, wherein the first surface has a pixel pad section and the second surface has a circuit pad section electrically connected to a light-emitting control circuit disposed on the second surface, and the bezel comprises: a first surface connecting portion; a second surface connecting portion, wherein an edge of the display panel closed to the pixel pad section and the circuit pad section is accommodated between the first surface connecting portion and the second surface connecting portion; wherein the first surface connecting portion and the second connecting portion are directly or indirectly integrated and together hold the edge of the display panel; and a conductive wire group, each conductive wire of the conductive wire group is disposed along the bezel and having a first end and a second end, wherein the first ends are disposed on pads of the first surface connecting portion, and the second ends are disposed on pads of the second surface connecting portion, wherein the pads of the first surface connecting portion correspond to pixel pads of the pixel pad section, and the pads of the second surface connecting portion correspond to circuit pads of the circuit pad section.

2. The bezel according to claim 1, further comprising a side plate, the side plate connecting the first surface connecting portion and the second surface connecting portion, the first surface connecting portion, the side plate, and the second surface connecting portion commonly forming an accommodation space so as to accommodate the display panel.

3. The bezel according to claim 1, further used for a second display panel, the second display panel having a third surface and a fourth surface, the third surface having a second pixel pad section and a second circuit pad section, the bezel including:
   a third surface connection portion; and
   a fourth surface connection portion, wherein an edge of the second display panel closed to the second pixel pad section and the second circuit pad section is accommodated between the third surface connection portion and the fourth surface connection portion.

4. The bezel according to claim 3, further comprising: a pivotal element connecting the first surface connecting portion, the second surface connecting portion, the third surface connection portion, and the fourth surface connection portion so as to adjust an included angle between the display panel and the second display panel opposite to the pivotal element.

5. The bezel according to claim 3, further comprising:
   a side plate, the side plate connecting the first surface connecting portion and the second surface connecting portion, the first surface connecting portion, the side plate and the second surface connecting portion commonly form an accommodation space so as to accommodate the display panel;
   a second side plate, the second side plate connecting the third surface connection portion and the fourth surface connection portion, the third surface connection portion, the second side plate and the fourth surface connection portion commonly forming a second accommodation space so as to accommodate the second display panel; and
   a pivotal element, the pivotal element connecting the side plate and the second side plate, so that an included angle between the accommodation space and the second accommodation space opposite to the pivotal element is adjustable.

6. The bezel according to claim 3, wherein each of the display panel and the second display panel has a pixel distance, a minimum total width of the first surface connecting portion and the third surface connection portion is smaller than or equals to 6 times of the pixel distance.

7. The bezel according to claim 1, wherein the first surface connecting portion includes a transparent material, the conductive wire includes a transparent conductive material.

8. The bezel according to claim 1, wherein the first surface connecting portion has a first long side and a first broadside, the second surface connecting portion has a second long side and a second broadside, the first long side is connected to the second long side, wherein the bezel further includes a guard plate, the guard plate connects the first broadside and the second broadside.

9. A display device, comprising: a display panel, the display panel has a first surface and a second surface opposite to each other, the first surface having a plurality of pixel pads, the second surface having a plurality of circuit pads electrically connected to a light-emitting control circuit disposed on the second surface; and a bezel including: a first surface connecting portion; a second surface connecting portion, wherein an edge of the display panel closed to the pixel pads and the circuit pads is accommodated between the first surface connecting portion and the second surface connecting portion; wherein the first surface connecting portion and the second connecting portion are directly or indirectly integrated and together hold the edge of the display panel; and a conductive wire group, each conductive wire of the conductive wire group is disposed along the bezel and having a first end and a second end, the first ends disposed on pads of the first surface connecting portion and respectively electrically connected to the corresponding pixel pads, the second end disposed on pads of the second surface connecting portion and respectively electrically connected to the corresponding circuit pads.

10. The display device according to claim 9, further comprising a side plate, the side plate connecting the first surface connecting portion and the second surface connecting portion, the first surface connecting portion, the side plate and the second surface connecting portion commonly forming an accommodation space so as to accommodate the display panel.

11. The display device according to claim 10, further comprising:
    a second display panel, the second display panel having a third surface and a fourth surface, the third surface having at least one pixel pad, the fourth surface having at least one circuit pad; wherein the bezel further includes:
    a third surface connection portion;
    a fourth surface connection portion, wherein an edge of the second display panel closed to the plurality of pixel pad and the plurality of circuit pad is accommodated between the third surface connection portion and the fourth surface connection portion; and
    a plurality of second conductive wires, each of the second conductive wires having a third end and a fourth end, the third ends disposed on the third surface connection portion and respectively electrically connected to the corresponding pixel pads, the fourth ends disposed on the fourth surface connection portion and respectively electrically connected to the corresponding second circuit pads.

12. The display device according to claim 11, wherein each of the display panel and the second display panel has a pixel distance, a minimum total width of the first surface connecting portion and the third surface connection portion is smaller than and equals to six times of the pixel distance.

13. The display device according to claim 11, wherein the bezel further includes: a pivotal element connecting the first surface connecting portion, the second surface connecting portion, the third surface connection portion and the fourth surface connection portion so as to adjust an included angle between the display panel and the second display panel opposite to the pivotal element.

14. The display device according to claim 11, further comprising:

a side plate, the side plate connecting the first surface connecting portion and the second surface connecting portion, the first surface connecting portion, the side plate and the second surface connecting portion commonly forming an accommodation space so as to accommodate the display panel;

a second side plate, the second side plate connecting the third surface connection portion and the fourth surface connection portion, the third surface connection portion, the second side plate and the fourth surface connection portion commonly forming a second accommodation space so as to accommodate the second display panel; and a pivotal element, the pivotal element connecting the side plate and the second side plate, so that an included angle between the display panel and the second display panel opposite to the pivotal element is adjustable.

15. The display device according to claim 9, wherein the display panel includes a pixel array, the pixel array has a plurality of light-emitting elements, wherein the at least one pixel pad is disposed on a side of the light-emitting element located at an edge of the pixel array away from the pixel array.

16. The display device according to claim 9, wherein the display panel includes a pixel array, the pixel array has a plurality of light-emitting elements, the at least one pixel pad is disposed between each of the light-emitting element located at an edge of the pixel array.

17. The display device according to claim 9, wherein the bezel further includes a positioning unit, and the display panel includes a counterpart positioning unit, the positioning unit and the counterpart positioning unit can be complemented each other.

18. The display device according to claim 17, wherein the positioning unit has a groove structure, and the counterpart positioning unit has a convex structure corresponding to the groove structure.

* * * * *